United States Patent [19]

Shimozono

[11] Patent Number: 4,678,346
[45] Date of Patent: Jul. 7, 1987

[54] STEPPING MOTOR FOR A CLOCK

[75] Inventor: Shigeru Shimozono, Tokyo, Japan

[73] Assignee: Seikosha Co., Ltd., Tokyo, Japan

[21] Appl. No.: 876,822

[22] Filed: Jun. 20, 1986

[30] Foreign Application Priority Data

Jun. 20, 1985 [JP] Japan .................................. 60-134921

[51] Int. Cl.$^4$ .......................... G04F 5/00; G06F 1/04
[52] U.S. Cl. .................................... 368/157; 368/160; 310/40 MM
[58] Field of Search ....................... 368/156, 157, 160; 310/40 MM

[56] References Cited

U.S. PATENT DOCUMENTS

| | | | |
|---|---|---|---|
| 3,984,972 | 10/1976 | Yoshino | 368/156 |
| 4,262,353 | 4/1981 | Okazaki et al. | 368/157 |
| 4,460,859 | 7/1984 | Remus et al. | 368/157 |
| 4,533,257 | 8/1985 | Kitano et Al. | 368/160 |

Primary Examiner—Vit W. Miska
Attorney, Agent, or Firm—Bruce L. Adams; Robert E. Burns; Emmanuel J. Lobato

[57] ABSTRACT

A stepping motor for use in a clock includes a rod core having an effective length L, and a coil wound around the rod core along the effective length L and having a thickness R defined between the center of the rod core and the outermost periphery of the coil. The effective length L and the thickness R satisfy the relation $10 \leq L/R \leq 40$. A stator is magnetically connected between the ends of the rod core. A rotor is rotatably disposed between opposed magnetic poles of the stator, and the rotor has a circular shape of a radius $r_0$ in the range of 1 to 2 mm. Electric pulses having a pulse width t in the range of 9 to 17mS are applied to the coil so that the stepping motor converts more than 20% of the electric energy of the pulses into rotational torque of the rotor.

19 Claims, 10 Drawing Figures

STEPPING MOTOR FOR A CLOCK

BACKGROUND OF THE INVENTION

(INDUSTRIAL FIELD OF THE INVENTION)

The present invention relates to a highly efficient clock.

Recently, attempts have been made to lower the current consumption of crystal clocks. In Japanese Patent Laid-Open No. 129970/1975, for example, it is disclosed that the dimensional ratio between a stator and rotor is set to a value within a predetermined range so as to lower the current consumption.

In the clock disclosed in the above-mentioned specification, the dimensional ratio of the stator and rotor is set to an optimum value. Even if an improvement has been made in this point, however, it is still impossible to obtain a sufficient efficiency, and the conversion efficiency of a conventional crystal clock motor remains at an extremely low level of 20% or less.

In additions, there has hitherto been no clock in which the drive pulse width of a motor is set from the viewpoint of high efficiency, and the drive pulse width of a motor has merely been set to a value which facilitates the production of motors and which is capable of avoiding an instable region. This point has also been a major cause which has made it impossible to improve the conversion efficiency.

DETAILED DESCRIPTION OF THE INVENTION

Figure 1:
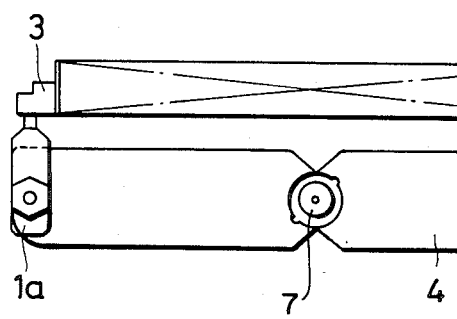
FIG. 1 is a front elevational view illustrating one embodiment of the present invention.
Figure 2:
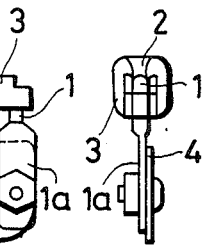
FIG. 2 is a side elevational view of the embodiment of FIG. 1 as seen from the right side.
Figure 3:
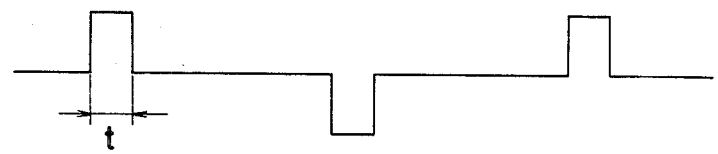
FIG. 3 shows the waveform of driving pulses.
Figure 4:
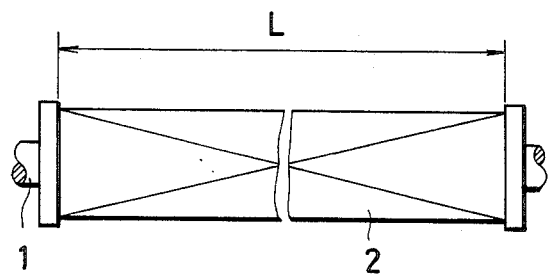
FIG. 4 is a fragmentary front elevational view of the essential parts of the embodiment show in FIG. 1.
Figure 5:
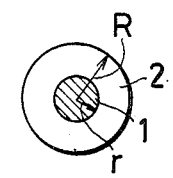
FIG. 5 is a side elevational view as seen from the right side of FIG. 4.

Referring first to FIGS. 1 and 2, reference numeral 1 denotes a bar-shaped or rod core having a circular cross-sectional configuration, around which a coil 2 is directly wound. Each end of the wound coil 2 is clamped by means of a plastic coil frame 3. Each end 1a of the core 1 is flattened by a press. The core 1 and a stator 4 composed of a pair of stator pieces are magnetically connected to each other by screwing respective ends 1a, 1a to respective ends of the stator 4. Reference numeral 7 designates a rotor composed of a rare earth magnet of energy product 30 made, for example, of SmCo and rotatably disposed between magnetic poles of the stator. Positive and negative pulses of a predetermined cycle, such as shown in FIG. 3, are alternatively supplied to the coil 2 of the stepping motor so that the rotor is rotated by 180 degrees at a time.

In the thus-arranged motor, an experiment is to find conducted relations between the drive pulse width on the one hand, and the starting voltage, the rotational the output torque and the comsumption current on the other, by setting the effective length L of the core along which the coil is wound to 42 mm, the radius r of the core to 1.5 mm, and the thickness R defined between the center of the core and the outermost periphery of the coil to 3.7 mm, and by arranging the stator and coil according to the specifications listed in the table below. Through this experiment, it is found that characteristics shown in FIG. 6 exist.

Incidentally, the range A shown by hatching is the area of instable operation.

Figure 7:
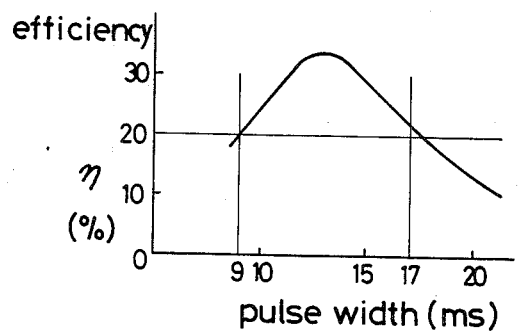
FIG. 7 is a diagram of characteristics illustrating the relationship between the pulse width and the conversion efficiency.

From this experimental data, it is possible to confirm that a correlation shown in FIG. 7 exists between the pulse width t and the conversion efficiency $\eta$.

|  | Item | Specifications |
| --- | --- | --- |
| Rotor | Material | SmCo |
|  | Diameter | 3.0 mm |
|  | Thickness | 1.2 mm |
| Stator | Material | 78 Permalloy |
|  | Notch angle ($\alpha$) | 45° |
|  | Notch radius (a) | 0.3 mm |
|  | Air gap (b) | 0.7 mm |
|  | Connection margin (c) | 0.1 mm |
|  | Expansion angle ($\beta$) | 90° |
| Coil | Material | Polyurethane wire |
|  | Diameter | 0.05 mm |
|  | No. of turns | 12,000 T |
|  | Resistance | 850 ohms |

Figure 8:
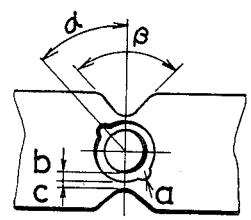
FIG. 8 shows the spatial arrangement of a stator and a rotor which are employed in experiments.

In the above Table, the notch angle, notch radius, air gap, connection margin, and expansion angle indicate the portions shown in FIG. 8.

Figure 6:
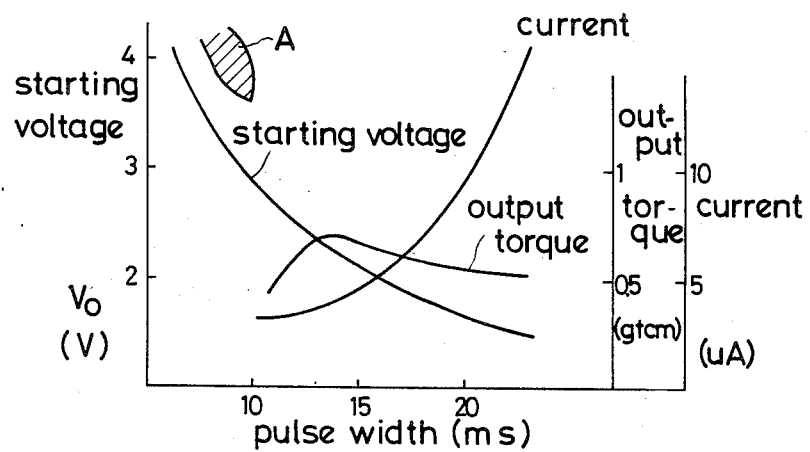
FIG. 6 is a diagram of characteristics illustrating the relationship among the pulse width on the one hand, and the starting voltage, output torque, and consumption current on the other, respectively.

In a case where the pulse width is 9 mS or below, the starting characteristics are poor, as shown in FIG. 6, and a sufficient output cannot be obtained (since it is impossible to obtain energy sufficient to overcome the coupling force between the rotor and the stator and the inertia of the rotor). Furthermore, it can also be seen that if a 3 V power source, which is often employed in a clock, is used, starting cannot be effected.

In addition, in the case of 17 mS or above, the output torque shows a somewhat declining trend, as shown in FIG. 6, and it is impossible to expect an increase of the torque commensurate with an increased current resulting from the elongaged pulse width, thereby causing the efficiency to decline sharply. Also, the current consumption increases abruptly from the vicinity of 17 mS.

From the foregoing, it can be seen that, by setting the pulse width to 9 to 17 mS, it is possible to obtain a high conversion efficiency of 20% or above, which has hitherto been unobtainable.

Also, it should be noted that, in a clock, the needle or hand is heavy and sealing properties are not very good, so that the needle may stop due to its loading with dust or the like, with the result that it is necessary to set the output torque to a relatively large level. For this reason, as the rotor, it is preferable to employ such a rare earth magnet as SmCo, CeCo, MMCo, (Nd, Pr)-Co, or Nd-Fe-B. At present, however, only a magnet with a maximum of 35 MGOe is available, and it is required in a clock, that the radius of the circular rotor must be set to 1 mm or above. In addition, in consideration of the starting characteristics, a very large rotor cannot be used, and the usable limit is 2 mm in radius. In other words, it is necessary to set the rotor radius $r_0$ in the range of 1 mm$\leq r_0 \leq$2 mm, and within this range the numerical value of aforementioned pulse width becomes meaningful and enables the high efficiency of converting the electric energy to the rotational torque of the rotor.

Figure 9:
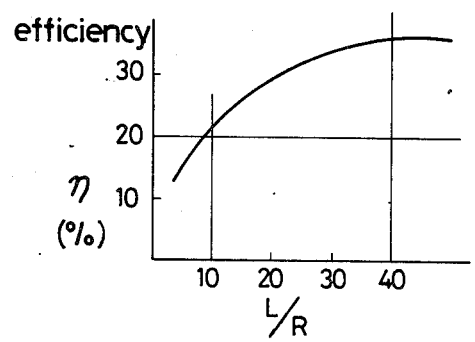
FIG. 9 is a diagram of characteristics illustrating the relation between a ratio L/R and the conversion efficiency.

In the aforementioned specifications, when an experiment is conducted by fixing the pulse width t to, for instance, 13.7 mS (the most efficient pulse width) and by varying ratio of the effective length L of the coil wound around the core to the thickness R from the center of the core to the outermost periphery of the coil, L/R, it is confirmed that there exists such a correlation between the conversion efficiency $\eta$ and the ratio L/R, as is shown in FIG. 9. In other words, if the ratio L/R is increased between 10 to 40, the efficiency improves correspondingly. However, if the ratio L/R is increased excessively, the winding process becomes technically difficult increased cost. On the other hand, if the length L is made excessively long, the magnetic reluctance increases and the leak magnetic flux increases, so that such a long coil is not favorable in terms of the magnetic circuitry and does not conform to the design concept of the compact size and is hence disadvantageous in view of construction.

In addition, if the core is made excessively small in diameter, the possibility of the magnetic path becoming saturated becomes high.

In consideration of the foregoing, it can be appreciated that it is optimal to establish the setting in the range of 10$\leq$L/R$\leq$40.

Incidentally, as can be seen from FIG. 9, even if the ratio L/R exceeds 40, the conversion efficiency does not improve, and no advantages can be found. In addition, if the ratio L/R becomes 10 or below, the winding becomes large, and the winding resistance only increases, so that the number of turns is not commensurate with the conversion efficiency, thereby causing the conversion efficiency to decline.

Also, it should be noted that the aforementioned relation between the ratio L/R and the conversion efficiency exists not only in the case of the pulse width 13.7 mS, but also show the same tendency in the range of 9 to 17 mS shown in FIG. 7. In other words, if the ratio L/R is varied when the pulse width is set to, for instance, 9 mS and 17 mS, the efficiency is always lower than in the case of the pulse width 13.7 mS, but the efficiency shows the same tendency as that shown in FIG. 9.

Figure 10:
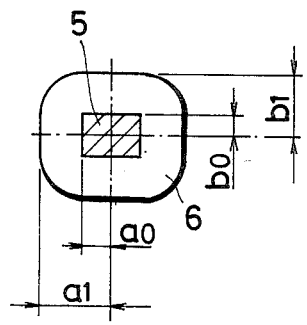
FIG. 10 is a cross-sectional view illustrating another embodiment of a core.

The cross-sectional configuration of the core is not limited to a circular one. A core 5 having, for example, a rectangular cross-section, as shown in FIG. 10, may also be employed. In such a case, the cross-sectional configuration of a coil 6 is not circular either, and the thickness R from the center of the core 5 to the outermost periphery of the coil is represented by a half of the sum of the thicknesses $a_1$ and $b_1$ between the core center and the outermost periphery.

A core of a square, elliptical, or other cross-sectional configuration may be used, in addition to those having the above-mentioned cross-sectional shapes. In any of these cases, the thickness R from the core center to the outermost periphery of the coil is calculated in a similar manner to that in the case of the rectangular configuration.

It is preferable for the ratio R/r between R and the radius r of the core to be set at 1.5 or more, because, if the coil winding thickness is very small with respect to the core radius, the length of the core around which the coil is wound must be made longer in order to obtain the necessary ampere-turns, making the overall size of the motor larger. In a core having a rectangular cross-section, the radius r of the core is represented by a half of the sum of $a_0$ of the length of the long side shown in FIG. 10 and $b_0$ of the length of the short side shown therein. The radius of a core having a square or elliptical cross-section is calculated in a similar manner.

When the present invention is used in the motor of a clock, it is preferable for the length L of the core about which the coil is wound to be 30 mm or more. In a clock, it is generally necessary to have a larger output torque, as mentioned earlier. Therefore, in order to fulfill the condition 10$\leq$L/R$\leq$40 when L is 30 mm or less, R must be set at 3 mm or less. With the thickness set in this way, it is very difficult to obtain a high output torque at a high conversion efficiency. In other words, to obtain a high torque with a low current comsumption, the current of the ampere-turns must be lowered, and the number of turns is correspondingly increased. In so doing, if L is too short, the number of turns must be made larger by making the core thinner. If the core is made thinner, however, the coil is magnetically saturated, lowering its efficiency. Therefore, L cannot be made very short. In a clock, a desirable value is 30 mm or more. A very long coil is not suitable for a small-sized motor, thus there is some upper limit of the length L.

In the above-described embodiment, the description is made of a coil wound directly onto a core. A coil bobbin which has a core inserted therein and about which the coil is wound may also be employed.

The coil and startor employed in the above embodiment are separate members and are screwed together, but the core and stator may alternatively be formed integrally.

Furthermore, in the above-described embodiment, description made of a clock, but the present invention may be employed in a timer as well.

According to the present invention, since, when the radius of the rotor is in the range of 1 mm$\leq r_0 \leq$4 mm, the pulse width t is set in the range of 9 mS$\leq$t$\leq$17 mS, it becomes possible to drive the rotor at a high efficiency, thereby allowing the life of the battery cell to be prolonged.

In addition, since the ratio of the length L of the coil wound around the core to the thickness R from the center of the core to the outermost periphery of the coil is set to 10$\leq$L/R$\leq$40, it is possible to obtain a high output at a low current comsumption, thereby making it possible to obtain a motor with a higher conversion efficiency.

Particularly in a clock, by setting the length L to 30 mm or above, it is possible to obtain a necessary output torque at a low current consumption, and a clock with a long life can be obtained.

What is Claimed Is:

1. In a clock having a core, a stator having a pair of magnetic poles and magnetically connected to both ends of the core, a coil wound around the core, a rotor rotatably disposed between the magnetic poles of the stator, means for producing driving pulses of a predetermined cycle supplied to the coil to rotate the rotor, and means for displaying time on the basis of the rotation of the rotor, the improvement comprising: said core having an effective length L along which the coil is wound, said coil having a thickness R between the center of the core and the outermost periphery of the coil, the length L of the core and the thickness R of the coil satisfying the relation $10 \leq L/R \leq 40$, said rotor having a radius $r_o$ in the range $1 \text{ mm} \leq r_o \leq 2 \text{ mm}$, and the driving pulses having a pulse width t in the range $9 \text{ mS} \leq t \leq 17 \text{ mS}$.

2. A clock according to claim 1, wherein the length L of said core is 30 mm or more.

3. A clock according to claim 1, wherein said rotor is composed of a rare earth metal.

4. A stepping motor for producing a stepwise rotary output in response to electric driving pulses applied thereto, comprising: a rod core having a pair of spaced-apart opposite ends; a coil wound around an effective length L of the rod core between the ends thereof, the coil having a thickness dimension R as measured from the center of the rod core to the outermost periphery of the coil, the effective length L and the thickness R satisfying the relation $10 \leq L/R \leq 40$; a stator magnetically coupled to the ends of the rod core, the stator having a pair of spaced-apart opposed magnetic poles; and a rotor rotatably disposed between the opposed magnetic poles, the rotor having a circular shape and having a radius in the range of 1 mm to 2 mm; the core, coil, stator and rotor being dimensioned so as to convert more than 20% of the electric energy of the driving pulses into rotational torque of the rotor when driving pulses having a pulse width in the range of 9 mS to 17 mS are applied to the coil.

5. A stepping motor according to claim 4, wherein the rod core has a circular cross section.

6. A stepping motor according to claim 4, wherein the rod core has a rectangular cross section.

7. A stepping motor according to claim 4, wherein the rod core has an effective length L not less than 30 mm.

8. A stepping motor according to claim 5, wherein the coil has a thickness R more than 1.5 times the radius of the circular rod core.

9. A stepping motor according to claim 4, wherein the coil is composed of a polyurethane wire.

10. A stepping motor according to claim 9, wherein the coil has 12,000 turns and a resistance value of 850 ohms.

11. A stepping motor according to claim 4, wherein the stator is composed of 78 permalloy.

12. A stepping motor according to claim 4, wherein the stator comprises a pair of separate stator pieces.

13. A stepping motor according to claim 12, wherein one of the ends of the respective stator pieces are magnetically connected to respective ends of the rod core.

14. A stepping motor according to claim 13, wherein the other of the ends of the respective stator pieces have means defining the respective magnetic poles.

15. A stepping motor according to claim 14, wherein the opposed magnetic poles are connected to each other to define an opening therebetween for accomodating the rotor.

16. A stepping motor according to claim 4, wherein the opposed magnetic poles have means defining a pair of notches.

17. A stepping motor according to claim 4, wherein the rotor is composed of a rare earth magnet.

18. A stepping motor according to claim 17, wherein the rare earth magnet is composed of SmCo.

19. A clock driven by a stepping motor according to claim 4.

* * * * *